Feb. 28, 1961     H. H. MERRIMAN     2,973,024

ASSEMBLY TOOL

Filed July 28, 1958

INVENTOR

HENRY H. MERRIMAN

BY *Beaman & Beaman*

ATTORNEY

2,973,024
ASSEMBLY TOOL

Henry H. Merriman, Jackson, Mich., assignor to Aeroquip Corporation, Jackson, Mich., a corporation of Michigan Filed July 28, 1958, Ser. No. 751,541

6 Claims. (Cl. 153—1)

The invention relates to an assembly tool for hose fittings and particularly pertains to a tool which is used to assemble segmental type fittings.

Large diameter hose lines, such as those employed in ship refueling and like applications wherein a flexible conduit of large capacity is required, use a hose fitting of considerable size and to facilitate assembly of large diameter hose and fittings the fittings may be constructed of arcuate segmental components. These components are circumferentially disposed about the hose and radially moved inward to sealing engage the hose and are locked in position by encircling clamping rings after proper contact with the hose is achieved. Fittings of this type are disclosed in the assignee's United States application for Patent No. 737,736 and the assembly tool of the invention is used to radially translate the segmental components of this type of fitting to permit ready assembly of such fittings with hose lines.

It is thus an object of the invention to provide an assembly tool for segmental hose fittings wherein the segments of the fitting are evenly radially translated throughout the circumference of the hose wherein pinching and squeezing of the hose between the segments is substantially eliminated.

A further object of the invention is to provide an assembly tool for segmental hose fittings wherein equal radial pressures are simultaneously exerted on all of the fitting segments and strain on the hose or fitting due to improper placement of the segment is prevented.

Another object of the invention is to provide a segmental hose fitting assembly tool having radially movable jaws incorporating track means cooperable with a circumferential tension means whereby rotative displacement of the jaws during clamping is minimized.

Figure 1:
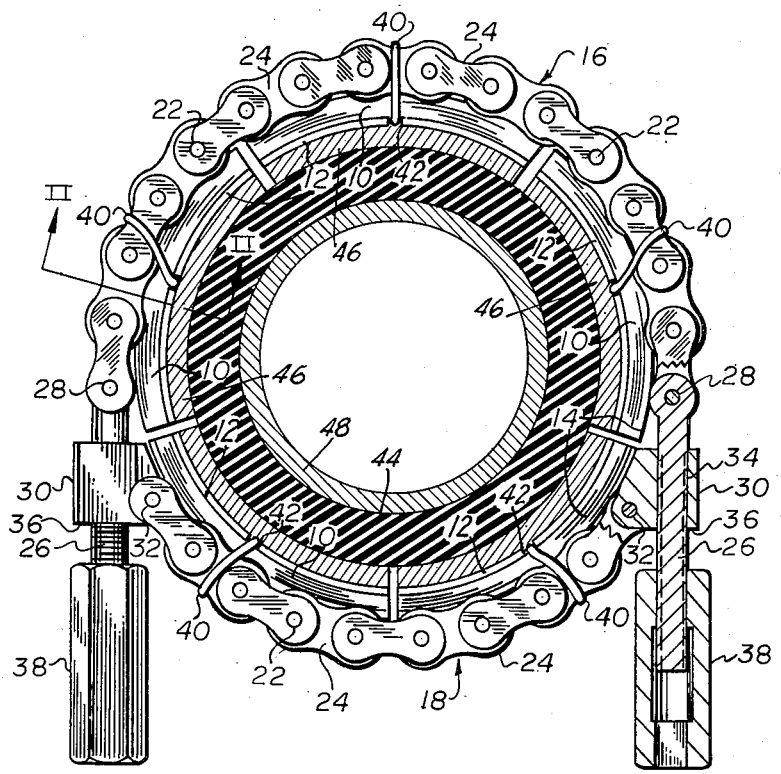
Figure 2:
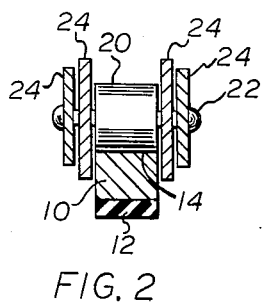
Figure 3:
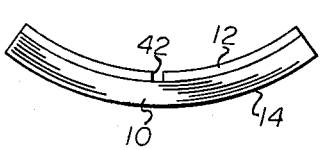

These and other objects of the invention will become apparent as the invention is described in the following specification and illustrated in the accompanying drawings wherein:

Fig. 1 is an elevational view of the tool of the invention in open or unclamped position, Fig. 2 is a sectional view taken along the line II—II of Fig. 1, and Fig. 3 is a side and end view of one of the jaws of the assembly tool incorporating the concepts of the invention.

The assembly tool basically consists of a plurality of jaws, circularly arranged and supported upon tension means for decreasing the diameter of the circle defined by the jaws and thus radially translating the jaws inwardly, thereby clamping a hose fitting within the circular jaw-defined region. In the preferred embodiment as illustrated in Fig. 1 the tool consists of a plurality of steel jaws 10, five in number, although more or less may be used depending on the diameter of the fitting to be accommodated and the number of segments employed in the fitting, as best results are obtained wherein a jaw is provided for each fitting segment. The jaws 10 define true circular arcs and are lined on the inner surface by a lining 12 which contacts the segments of the fitting. The lining 12 may be of brake lining material, rubber, leather or other relatively soft substance which will not mar the fitting. The outer surface of the jaws 14 is smooth and of the same arcuate configuration as the jaw proper to define a peripheral track 14 on which the roller chain rides as will be later apparent.

Radial movement of the jaws is produced by a roller chain which consists of two separate roller chains designated 16 and 18. These chains are of the type wherein spaced rollers or cylinders 20 are rotatably journaled on pins 22 which are interconnected by the links 24. It is very important to the proper operation of the tool that the rollers 20 freely rotate and thus proper clearances of the chain components must be strictly maintained and the chain kept free from foreign matter.

The chain 16 is provided with studs 26 pivotally affixed to a pin 28 at each end of the chain and the studs are threaded along a substantial part of this length. The chain 18 is provided with members 30, affixed to the ends of the chain by the pins 32, which are formed with a bore 34 through which the studs 26 may slidingly project. The lower surface 36 of the members 30 is formed planar and functions as an abutment for the nuts 38.

The nuts 38 are of sufficient length to permit easy manual operation and are of the usual hexagonal cross section for cooperation with a wrench. As shown in Fig. 1 the nuts are threaded upon studs 26 and are provided with an axial bore whereby the stud may extend entirely through the nut.

The jaws 10 are affixed to the chains 16 and 18 by means of holding rings 40 which may be of rubber and encircle both the jaws 10 and the chain to maintain the rollers 20 in engagement with the track 14. The lining 12 being parted at 42 for ring clearance.

In operation, the tool is opened to a sufficient extent to permit the tool to be slipped on over the hose fitting, e.g. the nuts 38 are unloosened to permit the chains 16 and 18 to be moved away from each other. The tool is positioned upon that portion of the hose fitting wherein a plurality of socket segments 46 circumscribe the hose 44 which is internally provided with a tubular nipple 48. It will be observed that a gap exists between the lateral edges of adjacent segments whereby considerable radial contraction of the segments is possible without the segments interfering with each other. The tool is located on the fitting such that each segment 46 is contacted by the lining of a single jaw 10 and thereupon the nuts 38 are rotated upon studs 26 for abutment with surface 36 which draws the adjacent ends of chains 16 and 18 toward each other. As the chains are tensioned the rollers 20 will roll on track 14, decreasing the circumference of the track and move the jaws radially inward compressing the fitting segments until the proper compression is obtained. The clamping band or ring is then applied to the exterior of fitting segments 46, locking them in place, and the nuts 38 may now be unloosened and the tool removed.

As the rollers 20 roll freely on the track of the jaws, the tendency of the chains to angularly rotate the jaws, with respect to the fitting axis, is minimized and thus the segments of the fitting will move truly radially, the rings 40 being loose enough and the relative movement of the chains to the jaws is small enough to prevent the rings 40 from angularly displacing the jaws during compression.

It will thus be understood that the invention produces an assembly tool which is portable, unitary, and may be quickly applied and removed to segmental hose fittings to aid in the assembly or disassembly thereof. The clamping pressure is uniformly distributed over all the jaws as the reaction forces produced in clamping are applied throughout the fitting periphery and each segment will receive the same radial force.

I claim:
1. In a segmental hose fitting assembly tool, a plurality of arcuate jaw members adapted to engage the segments of the hose fitting, said jaw members each having an inner concave segment engaging surface whereby said surfaces define a cylindrical circumference and tension means circumferentially engaging said jaw members adapted to translate said jaw members radially with respect to the axis of the hose fitting and contracting said circumference.

2. In a segmental hose fitting assembly tool, a plurality of arcuate jaw members adapted to engage the segments of the fitting, said jaw members each having an inner concave segment engaging surface whereby said surfaces define a cylindrical circumference, tension means circumferentially disposed about said jaw members adapted to radially translate said jaws and anti-friction means mounted on said tension means engaging said jaw members.

3. In a segmental hose fitting assembly tool, a plurality of jaw members each having a concave cylindrical arcuate surface defining a cylindrical circumference adapted to engage the segments of the fitting, a first flexible tension transmitting means circumferentially engaging a portion of said jaw members, a second flexible tension transmitting means circumferentially engaging the remainder of said jaw members and cooperating means mounted upon said first and second tension transmitting means adapted to create a tension within said transmitting means to radially translate said jaw members with respect to the axis of the fitting.

4. In a segmental hose fitting as in claim 3 wherein said first and second tension transmitting means engage said jaw members through anti-friction members.

5. In a segmental hose fitting assembly tool, a plurality of arcuate jaw members, a first flexible chain means, means slidably affixing part of said jaw members to said chain means, a second flexible chain means, means slidably affixing the remainder of said jaw members to said second chain means, roller means incorporated in said first and second chain means cooperating with a track defined on each of said jaw members, threaded stud members affixed to the ends of said first chain means, abutment members affixed to the ends of said second chain means having an opening defined therein slidably receiving said stud members, and nut means threaded on said stud members adapted to engage said abutment members whereby said first and second chain means may be drawn toward each other imparting a radial clamping action to said jaw members.

6. In an assembly tool as in claim 5 wherein said jaw members are lined for protection of the fitting.

References Cited in the file of this patent

UNITED STATES PATENTS 225,216    Earle _____ Mar. 9, 1880